(12) United States Patent  (10) Patent No.: US 7,404,371 B2
Schmitt  (45) Date of Patent: Jul. 29, 2008

(54) FLOATING LEISURE PLATFORM

(76) Inventor: Sebastian Schmitt, Rotebuehlstrasse 71, 70178 Stuttgart (DE)

( * ) Notice: Subject to any disclaimer, the term of this patent is extended or adjusted under 35 U.S.C. 154(b) by 0 days.

(21) Appl. No.: 11/389,225

(22) Filed: Mar. 27, 2006

(65) Prior Publication Data

US 2006/0162637 A1  Jul. 27, 2006

Related U.S. Application Data

(63) Continuation-in-part of application No. PCT/EP2004/010852, filed on Sep. 28, 2004.

(30) Foreign Application Priority Data

Oct. 2, 2003  (DE) .............................. 103 47 159
Feb. 12, 2004  (DE) ...................... 10 2004 008 155

(51) Int. Cl.
  *B63B 3/00* (2006.01)
  *B63B 17/00* (2006.01)
(52) U.S. Cl. ...................... 114/346; 114/343; 114/361; 114/363; 441/131
(58) Field of Classification Search ................ 441/129, 441/130, 131, 35, 40; 114/343, 345, 346, 114/361, 363, 66; 472/128, 129; 297/248, 297/249; 104/73
  See application file for complete search history.

(56) References Cited

U.S. PATENT DOCUMENTS

| 1,142,163 | A | | 6/1915 | Grzybowski |
| 1,343,341 | A | | 6/1920 | Berglann |
| 1,371,407 | A | | 3/1921 | Berglann |
| 2,520,412 | A | | 8/1950 | Jensen |
| 2,991,488 | A | * | 7/1961 | Cron, Sr. ..................... 114/344 |
| 3,032,046 | A | * | 5/1962 | Coonradt ..................... 135/90 |
| 3,032,783 | A | * | 5/1962 | Swanson, Jr. ............... 114/364 |
| 3,506,332 | A | * | 4/1970 | Dewey, Jr. et al. .......... 359/423 |
| 4,115,888 | A | | 9/1978 | Sievers |
| 4,367,689 | A | | 1/1983 | Lukehart |
| 4,516,943 | A | * | 5/1985 | Spieldiener et al. ........... 441/35 |
| 4,601,667 | A | * | 7/1986 | Hull ........................... 441/131 |
| 4,750,894 | A | * | 6/1988 | Nealey ........................ 441/40 |
| 4,788,962 | A | * | 12/1988 | Mashburn et al. ......... 126/25 R |
| 5,800,041 | A | * | 9/1998 | Poggi .......................... 362/101 |
| 6,257,943 | B1 | | 7/2001 | Peterson |
| 6,490,989 | B1 | | 12/2002 | Ray |

FOREIGN PATENT DOCUMENTS

| AU | 640 470 | 8/1993 |
| CA | 2 434 062 | 7/2002 |
| DE | 70 19 051 | 12/1970 |
| DE | 70 33 833 | 5/1971 |
| DE | 36 25 886 | 2/1988 |
| DE | 88 06 840 | 9/1988 |
| EP | 0 396 829 | 11/1990 |
| FR | 2 796 034 | 1/2001 |
| GB | 122 716 | 2/1919 |
| GB | 265 091 | 2/1927 |

OTHER PUBLICATIONS

DE-Z. "Jacht", Nr. 10; May 10, 1989 pp. 158-180.

* cited by examiner

*Primary Examiner*—Sherman Basinger
(74) *Attorney, Agent, or Firm*—Paul Vincent

(57) ABSTRACT

The invention relates to a floating leisure platform with a heating device (A) for food and a seating facility (14) for one or several people.

20 Claims, 10 Drawing Sheets

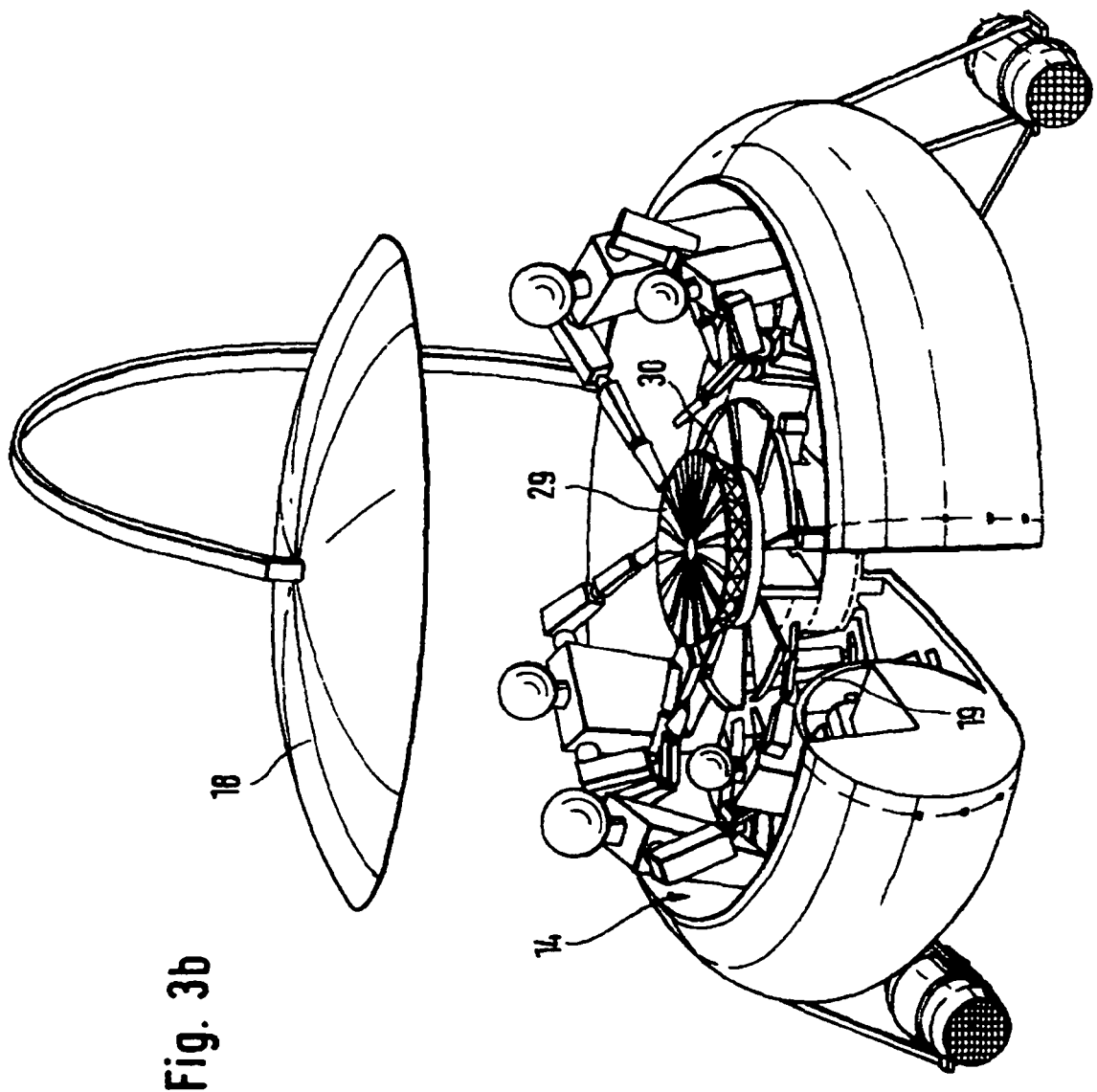

US 7,404,371 B2

FLOATING LEISURE PLATFORM

This application is a continuation in part of PCT/EP2004/010852 filed on Sep. 28, 2004 and claims Paris Convention priority of DE 103 47 159.6 filed on Oct. 2, 2003 as well as DE 10 2004 008 155.7 as filed on Feb. 12, 2004.

BACKGROUND OF THE INVENTION

The invention concerns a floating leisure platform.

There are conventional floating leisure platforms in the form of rafts, which are, however, relatively unattractive. The use of hired boats that can be driven on water by physical effort is also known (pedal boats). These devices no longer meet the leisure requirements of today's public.

It is therefore the underlying purpose of the invention to provide a floating leisure platform having a high leisure value, which is attractive and offers a wider variety of use.

SUMMARY OF THE INVENTION

This object is achieved by combining the two conventional objects such as floating boats driven by physical effort (pedal boats) with a barbecue unit which is integrated and floatingly disposed in the platform, the platform having two drives which are mounted thereto. All connections of the supporting components are plug-in to obtain a leisure device which is easy to transport and requires little storage space (e.g. for storing the device outside of the swimming season). Further advantageous measures are described in the dependent claims. The invention is shown in the drawings and is explained in more detail below.

This object is achieved by a leisure platform that can be used on all water surfaces during leisure time and which is, in particular, provided with a drive means in the form of drive units. The platform has a heating device, in particular, a barbeque, a wok or the like for food with a protective device to prevent inadvertent touching of this device, and an adjustable sunshade.

The combination of moving on water surfaces, and at the same time being able to prepare food is new. A heating device for food that can be carried by a person is disclosed in DE 101 45 231.

The inventive leisure platform offers an increased variety of use, since the leisure platform is provided with a drive, a sun shade, seats, shelves, storage compartments and a heating device for food, such that the owners of leisure parks, camping sites or artificial lakes etc. can offer the leisure platform to their guests.

The leisure platform is advantageous in that it can be used to increase the attractiveness of leisure centers and be provided for free or be rented.

The flexible and simple commercial usability of the leisure platform and the possibility to explore new business opportunities e.g. for all kinds of leisure parks, camping sites, artificial lakes etc. distinguishes the inventive leisure platform from a conventional raft.

In one variant of the invention, a storage device for gas bottles, in particular oxygen bottles for divers, is provided in addition to or instead of the heating device (A). This increases the leisure value of the leisure platform. Alternatively or additionally, a means for observing the bottom of the body of water 64 may be provided which can be used like a module instead of the heating device (see FIG. 6). To improve the view of the bottom, the observing device comprises a magnifying lens. Underwater floodlights 60 may also be provided (see FIG. 1a).

Further advantages, features and details of the invention can be extracted from the following detailed description of a particularly preferred embodiment of the invention with reference to the drawing. The features shown in the drawing and mentioned in the description and the claims may be essential to the invention either individually or in arbitrary combination.

BRIEF DESCRIPTION OF THE DRAWING

FIG. 3b shows a second perspective view of the leisure platform;

DESCRIPTION OF THE PREFERRED EMBODIMENT

The version of a circular or torus-shaped leisure platform shown in FIGS. 1a through 4b corresponds to a preferred embodiment of the leisure platform as claimed in the claims. Other shapes, e.g. a rectangular shape, are also feasible.

The leisure platform shown in FIGS. 1a through 4b substantially consists of a central bottom plate 1 to which five main supports 2a through 2e are inserted and secured via insertion bolts. A storage compartment 3 for gas bottles 4 of a heating device A, i.a. a barbeque, is mounted to the bottom plate 1 (see FIGS. 4a and 4b)

Figure 4A:
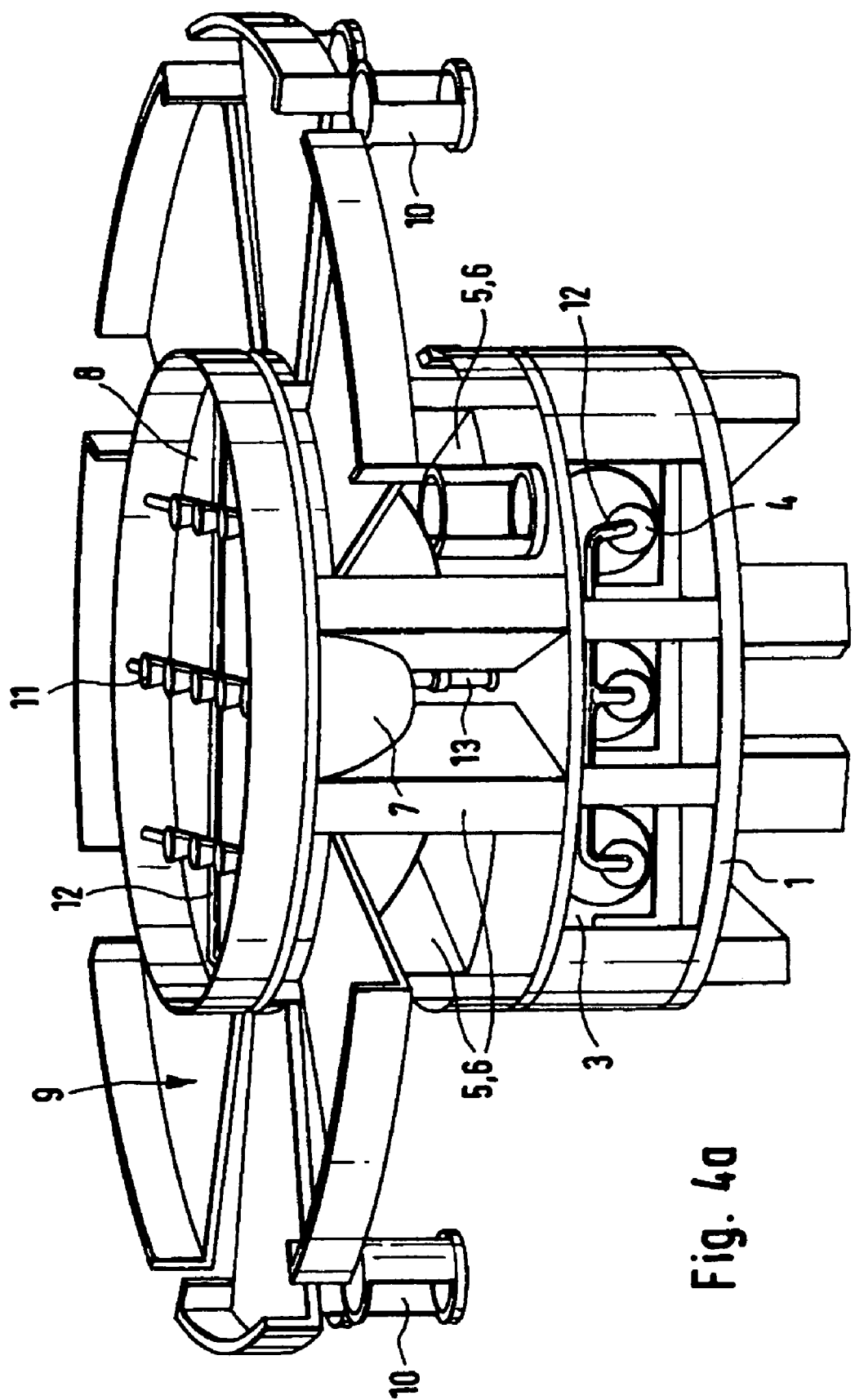
FIG. 4a shows a first detailed view of the floatingly disposed barbeque unit.
Figure 4B:
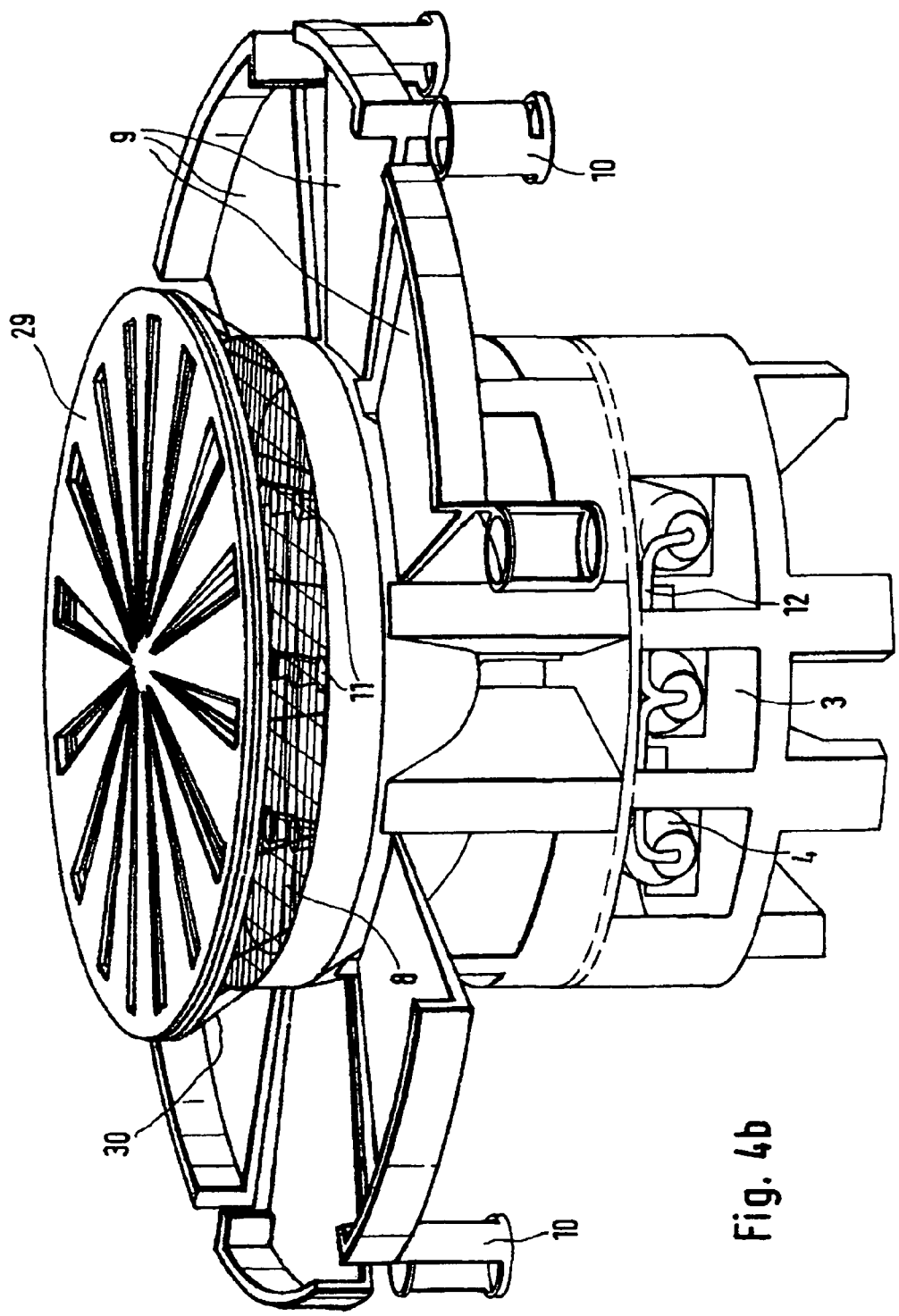
FIG. 4b shows a second detailed view of the floatingly disposed barbeque unit.

Eight supporting blocks 5 are mounted to the storage compartment 3, which are necessary to receive the barbeque tray and divide the individual storage compartments 6 associated with each seat. The supporting blocks 5 have a ball 7 disposed in a simple manner on the inclined side which ensures floating disposal of the barbeque tray 8 (FIGS. 4a and 4b).

Figure 1A:
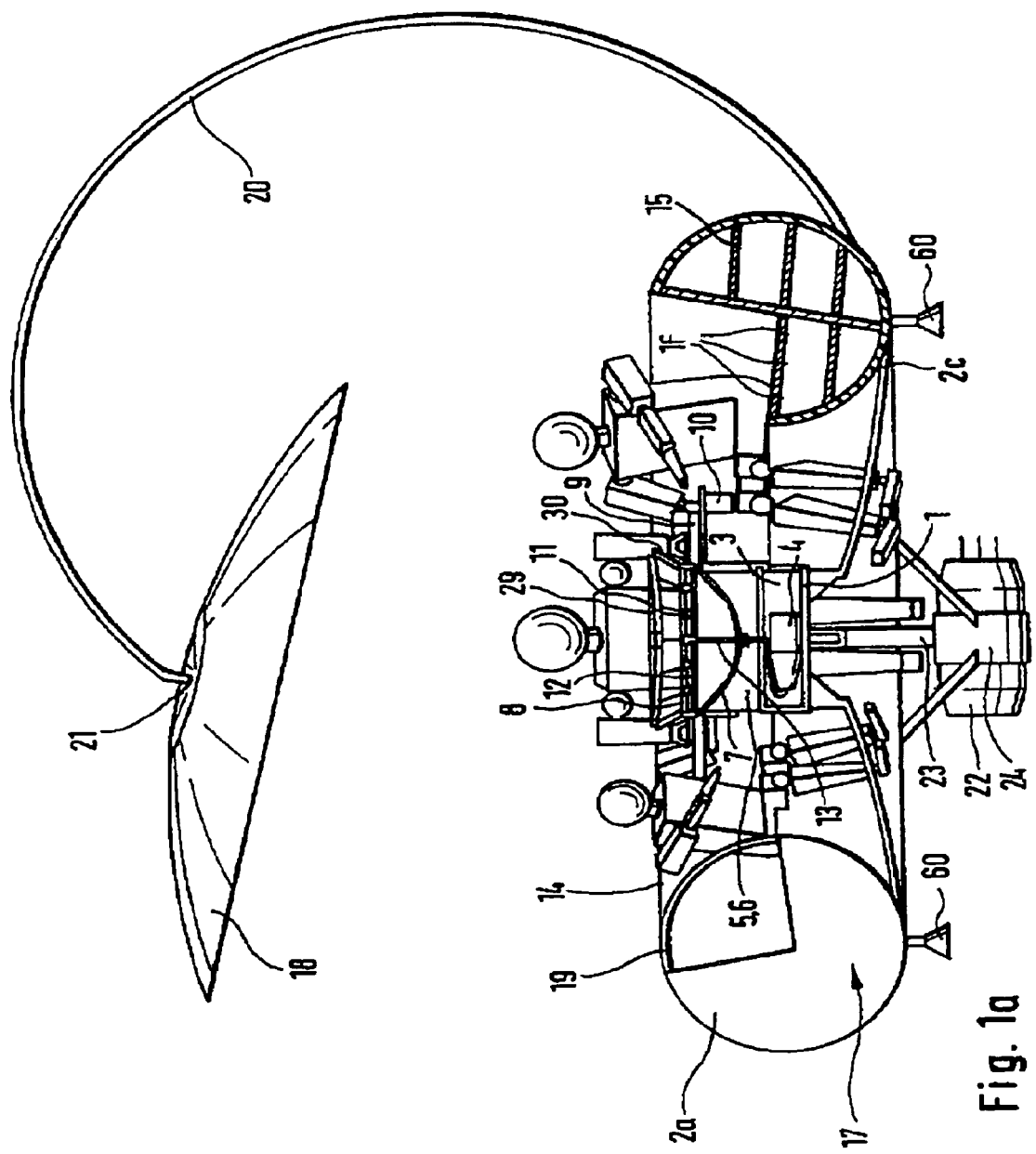
FIG. 1a shows a first longitudinal section through the leisure platform.
Figure 1B:
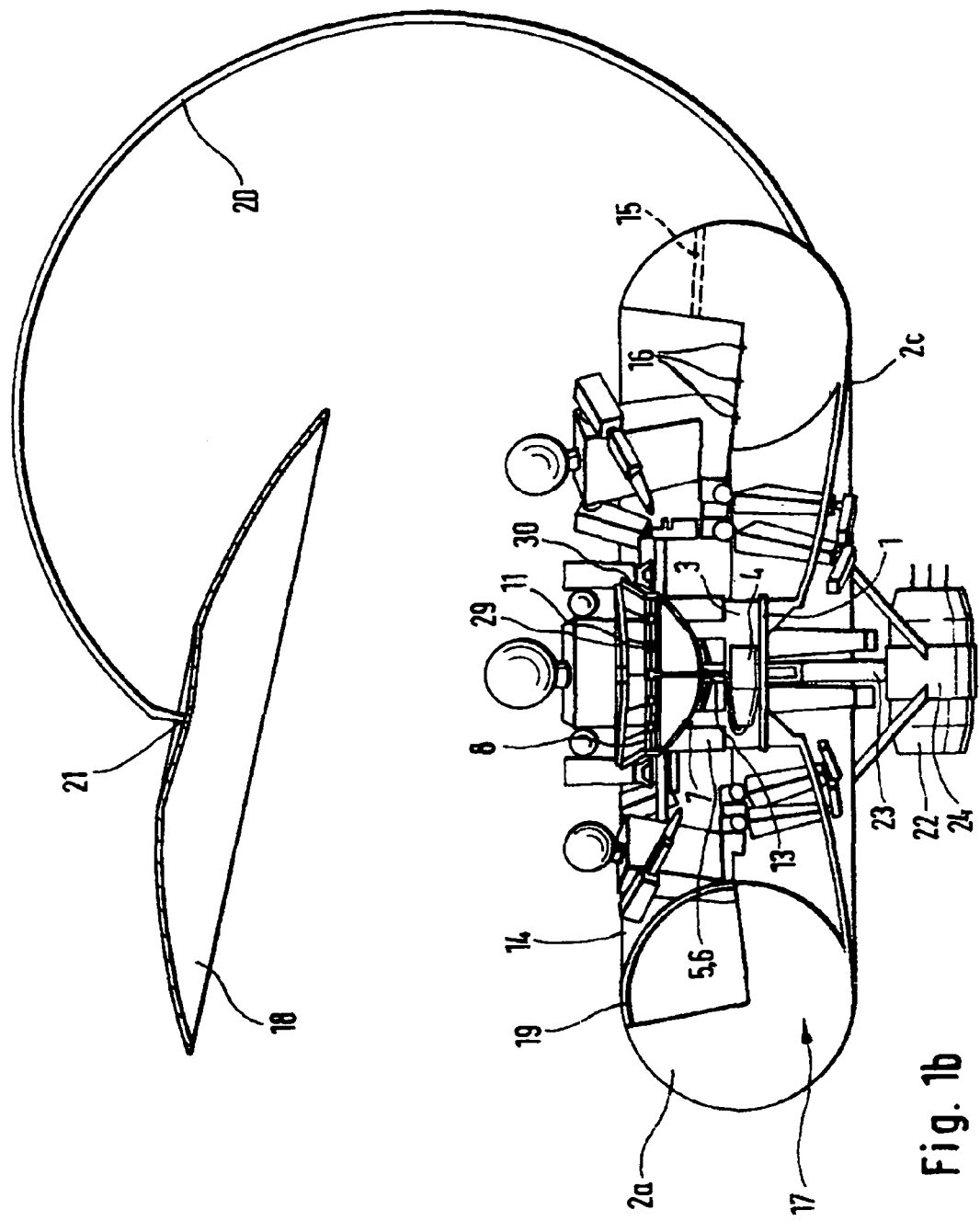
FIG. 1b shows a second longitudinal section through the leisure platform.
Figure 2A:
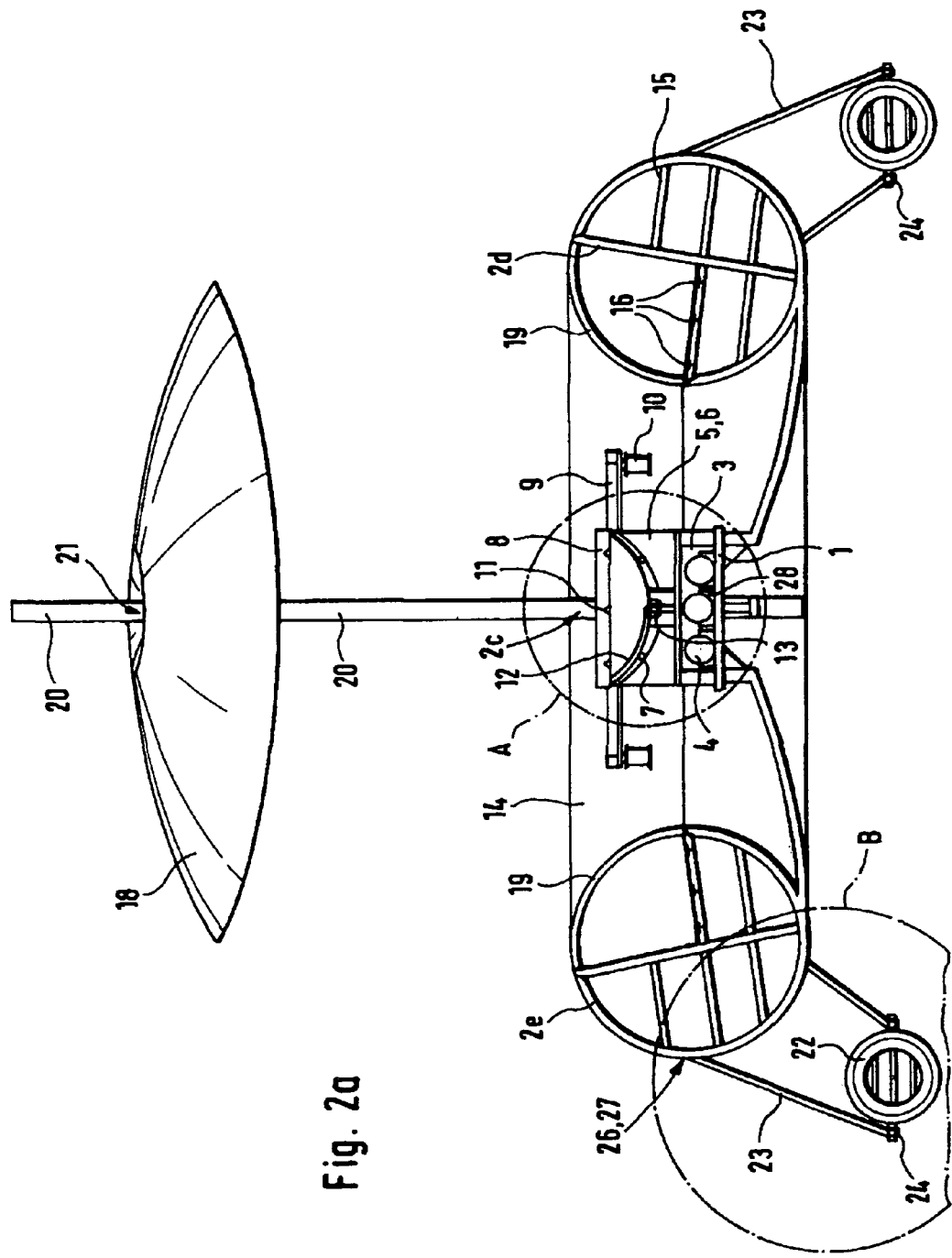
FIG. 2a shows a first cross-section through the leisure platform.
Figure 2B:
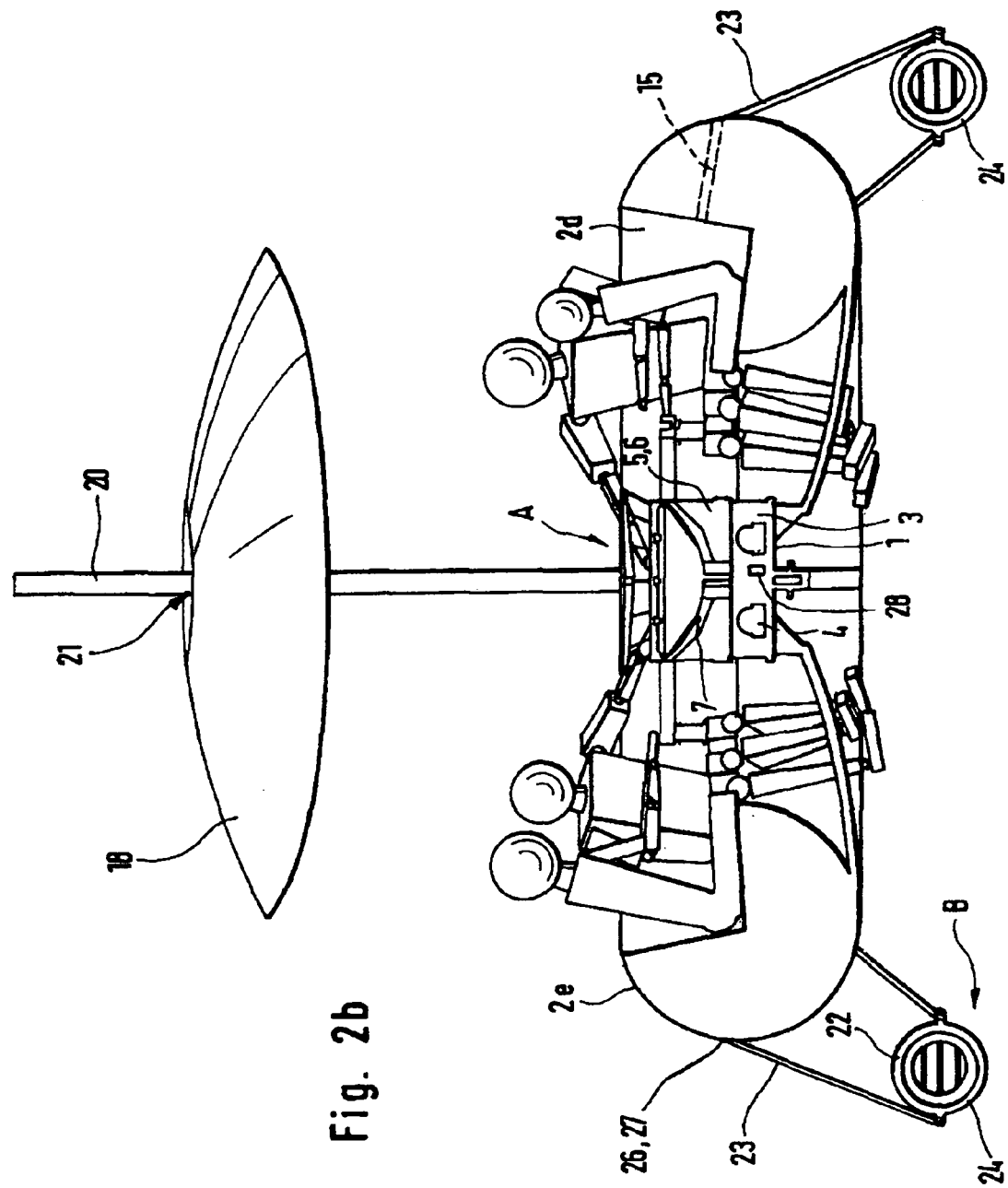
FIG. 2b shows a second cross-section through the leisure platform.
Figure 3A:
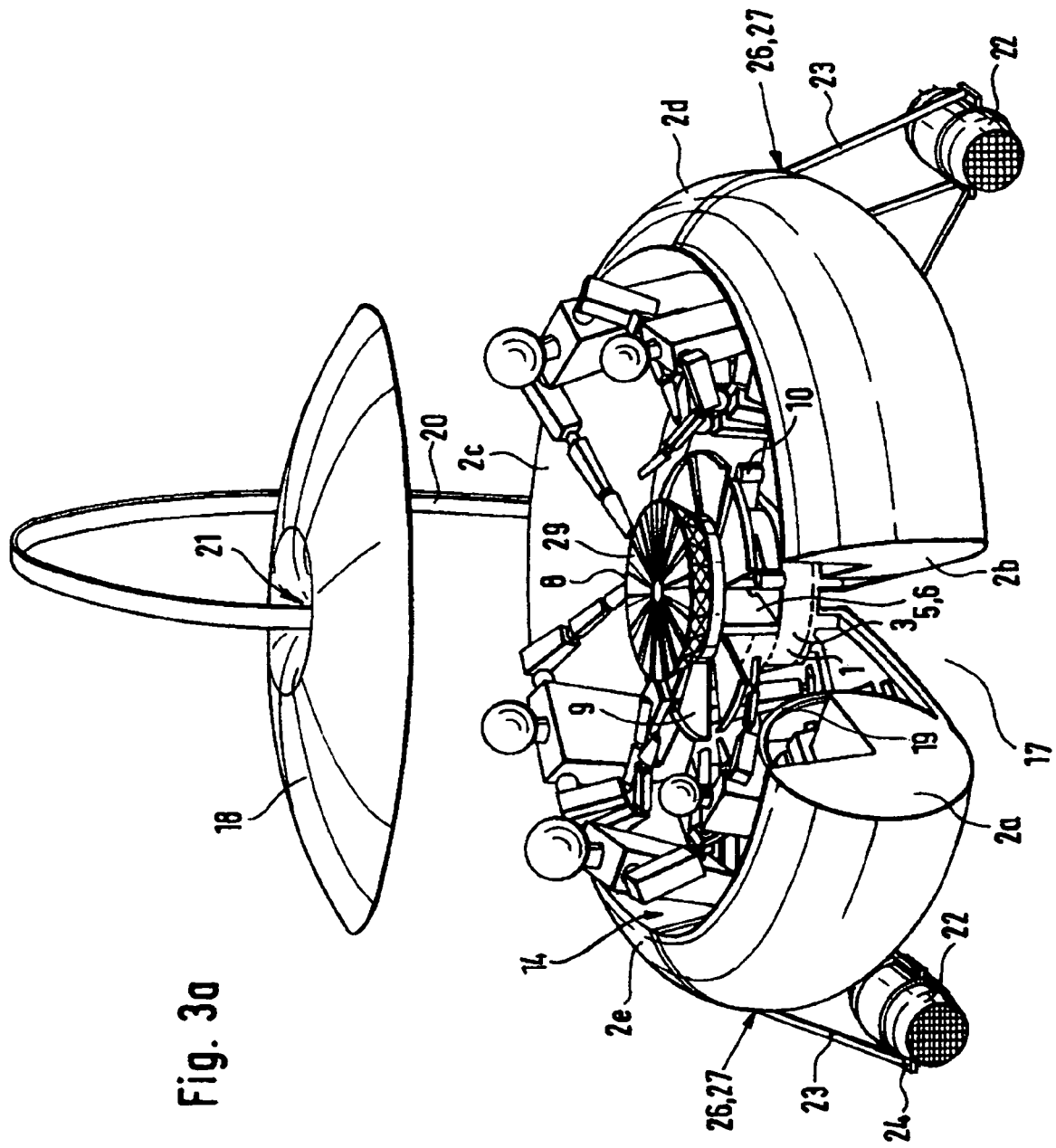
FIG. 3a shows a first perspective view of the leisure platform.

Seven table units 9 are mounted between the supporting blocks 5. The table unit on the entrance side is omitted (FIGS. 3a and 3b). These table units 9 are produced from an appropriate material and comprise a table with an edge to prevent things from falling off and one storage compartment 6 for each passenger. Additional holders 10 for drinks may be mounted to these table units 9.

The barbeque tray 8, which is provided with gas burners 11 connected to each other via flexible gas hoses 12 and connected to the gas bottles 4 via a plug coupling 13, has a protective device 29 protecting the passengers from inadvertently contacting the grill. It is screwed to the barbeque tray 8 via spacers 30 (FIGS. 4a and 4b).

The protective device 29 is thermally insulated and does not transfer the heat from the lower to the upper side. It consists of two disks which permit passage of barbeque smoke through slots (FIGS. 4a and 4b).

The use of flexible gas hoses 12 does not impair the movability of the barbeque tray 8 in case of unexpected shocks. The barbeque tray 8 may be removed from the cavity having the shape of the contour of the barbeque tray 8, if required. The supporting blocks 5 and the table unit 9 thereby define this cavity with outer shapes assuming the contours of the barbeque tray 8.

When the barbeque unit has been assembled as is shown in FIGS. 4a and 4b, the seating ring segments 14 which are deep-drawn from plastic material, are inserted between the main supports 2a through 2e. These seating ring segments 14 may have the same size and also consist of an inflatable material. Three main supports 2a, 2d and 2e comprise three guiding rails 15 on each side, which serve to connect the seating ring segments 14 to the main supports 2a through 2e. They also ensure correct seating of the seating ring segments 14.

The seating ring segments 14 are screwed in a non-positive manner to the main supports 2a, 2e via screws 16 and conical holes provided on the outside of the edge of the seating surfaces. Each main support 2a, 2e has a guiding rail 15 on only one side to produce an entrance area 17 (FIGS. 3a and 3b). Each of the main supports 2a, 2b additionally comprises a handrail 19 having the shape of a quarter of a circle which ensures safe entry to the entrance area 17.

After assembly of the above-described components, one obtains an annular, floating platform having a barbeque unit which is separate from the main structure. The drive units B and a sunshade 18 are subsequently mounted. The sunshade 18 is mounted to a curved hollow profile 20 plugged to the main support 2c via a flexible holder 21. The flexible holder 21 permits turning of the sunshade 18 in all directions to provide shade for the overall platform, depending on the requirements.

In order to move the leisure platform on water surfaces, the drive units B are movably mounted to the main supports 2d, 2e. The drive units B each consist of a motor-driven diving drive 22 known from diving, and a main receptacle 23 and a mounting clamp 24. The diving drive 22 is clamped between the main receptacle 23 and the mounting clamp 24 and these components, taken together, have an inner diameter corresponding to the outer diameter of the diving drive 22. The main receptacle 23 and the mounting clamp 24 are attached to each other via screws. In case the platform runs aground, e.g. on the bottom of a lake, the drive units B are hinged to the main supports 2d, 2e via sleeves 26 mounted to each of the main supports 2d, 2e. The main receptacle 23 has the shape of a fork at the top to surround the sleeve 26. The bolt 27 provides a hinged connection to the drive unit B and the main supports 2d, 2e.

Figure 6:
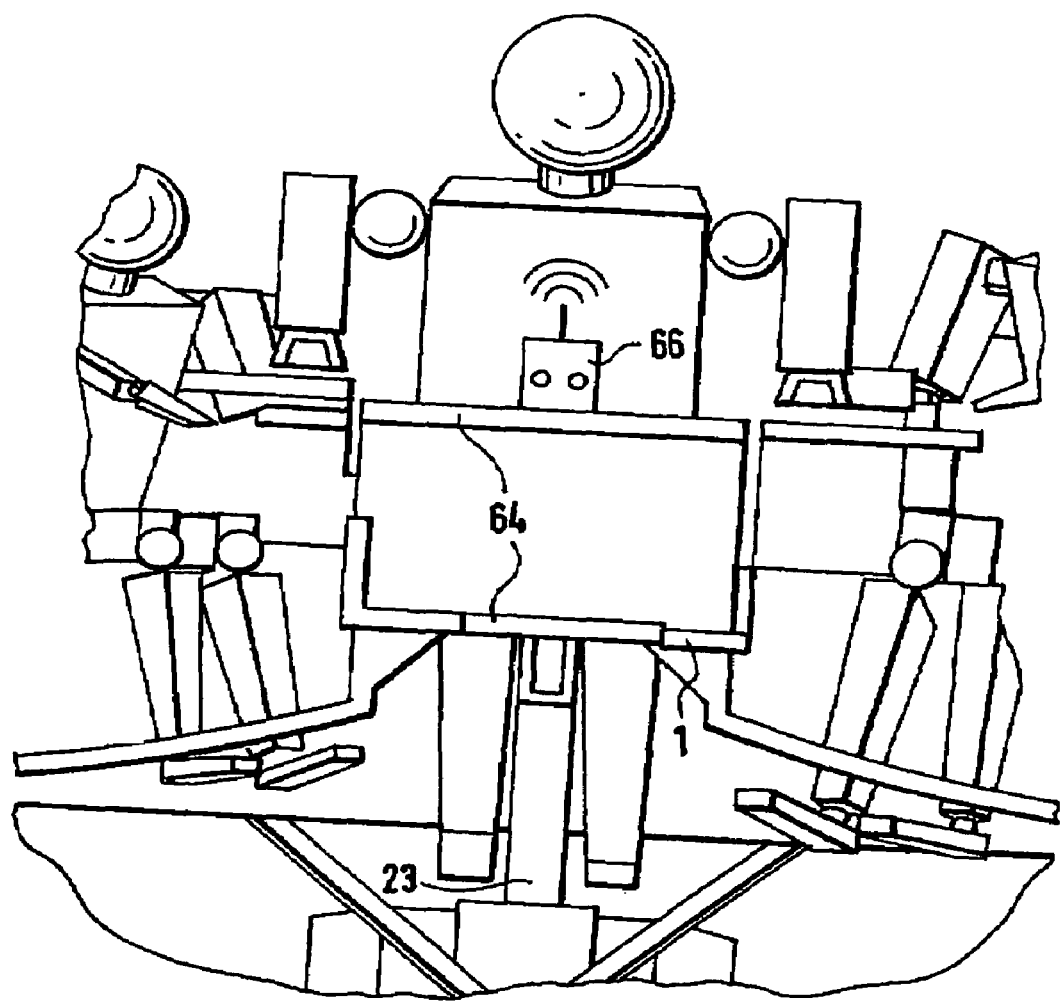
FIG. 6 shows an expanded view of the central portion of the leisure platform as illustrated in FIG. 1a in which the barbeque unit is replaced with means for observing the underwater bottom.

The platform is controlled via a control panel 66 comprising two buttons (see FIG. 6). By pressing the left hand button, the right hand diving motor 22 is started and the platform moves to the left. By pressing the right hand button on the control panel, the left hand diving motor is started and the platform moves to the right. By pressing both buttons at the same time, the platform moves forward.

The control pad is connected to a cable at the control electronics 28 provided in the center of the storage compartment 3. Two cables extend from the control electronics 28 through the main supports 2d, 2e to the respective drive units B to pass on the control commands entered via the control panel to the drive units B to permit navigation of the platform.

It must be emphasized that all components are formed as modules. This reduces production costs and permits rapid assembly of the leisure platform. The space required for storage is also small since the platform can be stored in a disassembled or partially disassembled state.

The torus consists of two halves of substantially the same design. The entrance region 17 is manufactured by inserting a slider into the injection mold at the appropriate position. The holder for the drive motor is manufactured on the opposite side with the assistance of an additional slider, inserted into the injection mold. The basic shape of the device nevertheless remains substantially the same. The two halves have pins and holes and a peripheral seal on their abutting surfaces to prevent water from entering.

Figure 5:
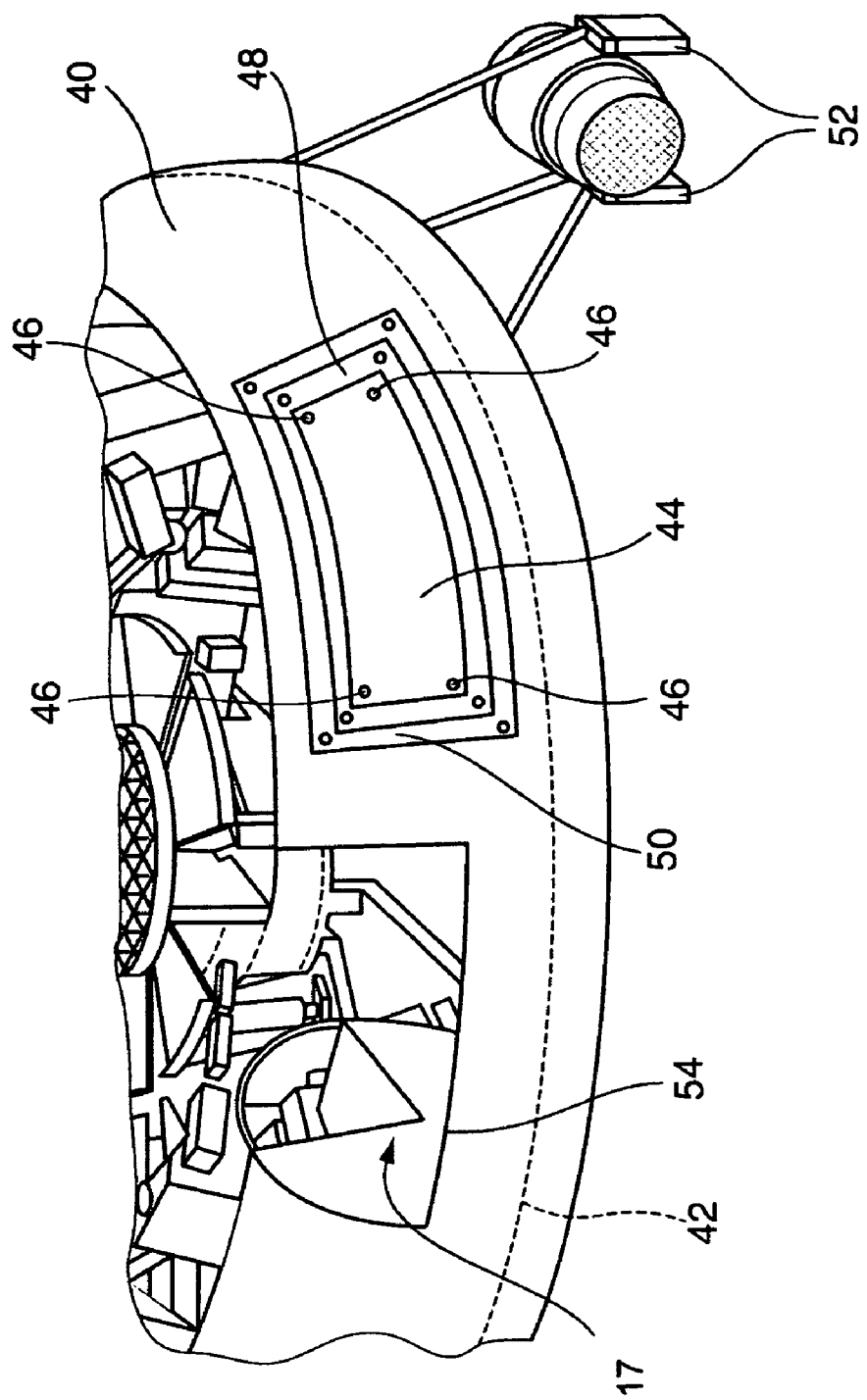
FIG. 5 shows an detail view of the leisure platform, illustrating additional features thereof.

As best seen in FIG. 5, the outer periphery 40 of the torus has depressions above the water line 42 into which advertising signs or solar cells 44 (which may also be in the form of a sheet) can be clipped, screwed on, or plugged in using appropriate fastening means 46. The depressions have a depth which corresponds to the thickness of the signs, such that these are recessed with their outer surface being substantially flush with the outer surface 40 of the torus. Since the torus is made from plastic material, glued sheets may not adhere well. For this reason, clipped, plugged, or screwed in signs are preferred, in particular, since they cannot loosen in water. The advertising signs 44 can moreover be exchanged more easily than glued sheets and can be re-used. The solar cells 44 serve for electric drive, for music, or for illumination. Moreover, the seating surfaces 48 in which the inserts 44 fit can also be separately clipped on and removed from corresponding holders 50. In this manner, certain color combinations can be used which are associated with the colors of a particular company. The device may be used in water and also ashore, and therefore comprises feet 52, which may be detachable. The entrance region 17 is provided with a step 54 to ease access and exiting while nevertheless maintaining the structure well above the water line 42.

I claim:

1. A floating leisure platform for one or more persons, the platform comprising:
    means defining a toroidal floatation body, said floatation body having a vertical cross section whose periphery extends in a substantially circular fashion in an outer upper region, an outer lower region, and an inner lower region, said floatation body defining a notch disposed about an inner upper region thereof, said notch having a first surface extending downwardly in a substantially vertical direction from an upper portion of said outer upper region and a second surface contiguous to said first surface and extending in a substantially horizontal direction to an upper portion of said inner lower region, said notch structured and dimensioned as a seat support surface, wherein said floatation body comprises a plurality of seating ring segments having a same size, and further comprising seats fashioned in said seating ring segments at inner sides thereof.

2. The leisure platform of claim 1, wherein the platform is of modular construction.

3. The leisure platform of claim 1, further comprising storage compartments for food.

4. The leisure platform of claim 3, further comprising table units structured and dimensioned for connection to said storage compartments for food.

5. The leisure platform of claim 1, further comprising a sun shade having a support profile mounted to the leisure platform.

6. The leisure platform of claim 5, wherein a connection between said sun shade and said support profile comprises a flexible connection to shade all users.

7. The leisure platform of claim 1, further comprising a drive means for freely moving the leisure platform in all directions on a water surface.

8. The leisure platform of claim 7, further comprising a mobile control device for directing motion of the leisure platform.

9. The leisure platform of claim 1, wherein said seats and/or modules of the leisure platform are made from an inflatable material.

10. The leisure platform of claim 1, wherein modules of the leisure platform comprise main supports, a central bottom plate, storage compartments, supporting blocks, table units, and/or drink holders made from a plastic material.

11. The leisure platform of claim 1, further comprising underwater floodlights.

12. The leisure platform of claim 1, further comprising a heating device for food, disposed in a central opening of said floatation body.

13. The leisure platform of claim 12, further comprising means for disposing said heating device in a floating or suspended manner to horizontally balance out and compensate for pitching of the platform.

14. The leisure platform of claim 12, wherein said heating device is disposed in a floating manner via support blocks and a central ball.

15. The leisure platform of claim 12, wherein said heating device comprises a device for protecting users from inadvertent contact with said heating device.

16. The leisure platform of claim 15, wherein said protecting device is thermally insulated to block heat from said heating device from passing from a lower to an upper side of said protecting device.

17. The leisure platform of claim 12, further comprising a storage device for gas bottles and/or for oxygen bottles for divers, wherein said storage device is structured and dimensioned to replace a region occupied by said heating device.

18. The leisure platform of claim 12, further comprising a means for observing an under water bottom, wherein said observing means are structured and dimensioned to replace a region occupied by said heating device.

19. The leisure platform of claim 18, wherein said heating device can be exchanged for said observing means in a modular manner.

20. The leisure platform of claim 18, wherein said observing means comprises a magnifying lens.

* * * * *